US008335777B2

(12) United States Patent
Miles et al.

(10) Patent No.: US 8,335,777 B2
(45) Date of Patent: Dec. 18, 2012

(54) ADVANCED DIRECTORY SERVICES

(75) Inventors: Alvin Charles Miles, Stockbridge, GA (US); John Jeffrey Decker, Decatur, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 752 days.

(21) Appl. No.: 11/470,125

(22) Filed: Sep. 5, 2006

(65) Prior Publication Data
US 2008/0071554 A1 Mar. 20, 2008

(51) Int. Cl.
*G06F 17/30* (2006.01)

(52) U.S. Cl. .................. 707/708; 707/769; 379/265.02; 379/219

(58) Field of Classification Search ........................ None
See application file for complete search history.

(56) References Cited

U.S. PATENT DOCUMENTS

| | | | | |
|---|---|---|---|---|
| 4,979,206 A | * | 12/1990 | Padden et al. | 379/88.01 |
| 6,233,316 B1 | * | 5/2001 | Schier et al. | 379/88.03 |
| 6,523,021 B1 | * | 2/2003 | Monberg et al. | 707/2 |
| 7,085,257 B1 | * | 8/2006 | Karves et al. | 370/352 |
| 2003/0152200 A1 | * | 8/2003 | Bruce et al. | 379/88.18 |
| 2004/0037400 A1 | * | 2/2004 | Newkirk | 379/88.16 |
| 2004/0204958 A1 | * | 10/2004 | Perkins et al. | 705/1 |
| 2004/0210568 A1 | * | 10/2004 | Makus et al. | 707/3 |
| 2004/0243549 A1 | * | 12/2004 | Richartz et al. | 707/3 |

\* cited by examiner

*Primary Examiner* — Son T Hoang
*Assistant Examiner* — Michele Choi
(74) *Attorney, Agent, or Firm* — Woodcock Washburn LLP

(57) ABSTRACT

Included are embodiments for providing advanced directory services. One embodiment of a method includes receiving categorical data related to a desired listing, wherein the categorical data is configured to describe at least one category associated with the listing, wherein the at least one listing includes at least one communications address. Other embodiments include receiving sub-categorical data related to the desired listing, wherein the sub-categorical data is configured to describe at least one sub-category associated with the at least one category. Still other embodiments include sending a search request for at least one listing, wherein the at least one listing is associated with the received categorical data and wherein the at least one listing is associated with the received sub-categorical data.

14 Claims, 12 Drawing Sheets

```
                                                          ┌─ 370
┌──────────────────────────────────────────────────────┐
│ CALLER INFORMATION                                   │
├──────────────────────────────────────────────────────┤
│                                                      │
│  NAME:              JOHN DOE                         │
│                                                      │
│  ADDRESS:           123 FAKE STREET                  │
│                     ATLANTA, GEORGIA 30305           │
│                                                      │
│  PHONE NUMBER:      404-555-1234                     │
│                                                      │
│  REQUEST:           GYM                              │
│                     CLOSE TO HOME                    │
│                     FREE WEIGHTS                     │
│                                                      │
│                                                      │
│  PREVIOUS REQUESTS: PIZZA DELIVERY                   │
│                     OPEN AFTER 2:00 AM               │
│                     DELIVER TO HOME (3-MILE RADIUS)  │
│                                                      │
│  SELECTIONS:        CLOSEST                          │
│                     CLOSEST                          │
│                                                      │
│                                                      │
└──────────────────────────────────────────────────────┘
```

FIG. 3

CALLER REQUEST — 470

| | |
|---|---|
| NAME | JOHN DOE |
| REQUEST | GYM |
| LOCATION | CLOSE TO HOME |
| EQUIPMENT | FREE WEIGHTS |
| EQUIPMENT | SWIMMING POOL |
| EQUIPMENT | BASKETBALL COURT |
| AMENITIES | ENTER TEXT |
| CLASSES | ENTER TEXT |
| PERSONAL TRAINERS | ENTER TEXT |
| HOURS | ENTER TEXT |

SEARCH

| CALLER REQUEST | |
|---|---|
| NAME | JOHN DOE |
| REQUEST | MEXICAN RESTAURANT |
| LOCATION | CLOSE TO DIAMOND'S |
| MENU | ENTER TEXT |
| HOURS | ENTER TEXT |
| RESERVATIONS | ENTER TEXT |

FIG. 8

ADVANCED DIRECTORY SERVICES

BACKGROUND

Often people desire to begin a communication with a person or business but do not have the desired data to initiate that communication. In such a scenario, a caller can refer to a telephone book, which can include "white pages" listings and "yellow pages" listings of potential callees. While a telephone book can provide information regarding a desired listing, this information can be limited as relative location, amenities, and other information are generally not available as search criteria. As a nonlimiting example, telephone book listings are generally organized according to name or type of business (or both). While this can assist the caller in locating a desired listing, oftentimes this is the only criteria available to the caller for narrowing the search for a desired listing. Additionally, oftentimes a phone book is not readily available to the caller, as the caller could be using a public telephone, a cellular telephone, or otherwise not have access to a phone book.

As alternatives to the telephone book, the caller may call a directory assistance service or consult a directory assistance service provided via the Internet. Similar to a telephone book, a directory assistance service can provide a communications address (such as a telephone number, Internet Protocol address, email address, instant messaging address, or other data for initiating a communication) for a desired listing. However, this information can generally be provided to callers that know the name of the desired listing. A caller who does not know the exact name of the listing can oftentimes become frustrated in trying to locate the desired listing.

Thus, a heretofore unaddressed need exists in the industry to address the aforementioned deficiencies and inadequacies.

SUMMARY

Included are methods for providing advanced directory services. One embodiment of a method includes receiving categorical data related to a desired listing, wherein the categorical data is configured to describe at least one category associated with the listing, wherein the at least one listing includes at least one communications address. Embodiments of the method may also include receiving sub-categorical data related to the desired listing, wherein the sub-categorical data is configured to describe at least one sub-category associated with the at least one category. Still other embodiments of the method include sending a search request for at least one listing, wherein the at least one listing is associated with the received categorical data and wherein the at least one listing is associated with the received sub-categorical data.

Also included are computer readable mediums for providing advanced directory services. One embodiment of a computer readable medium includes logic configured to receive categorical data related to a desired listing, wherein the categorical data is configured to describe at least one category associated with the listing, wherein the at least one listing includes at least one communications address. Embodiments of the computer readable medium may also include logic configured to provide at least one prompt for at least one sub-category the at least one sub-category being associated with the at least one category, logic configured to receive data related to the at least one sub-category, and logic configured to send a search request for at least one listing, wherein the at least one listing is associated with the received categorical data and the data related to at least one sub-category.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 3 is an exemplary screenshot of caller data that can be displayed on the workstation from FIG. 1.

FIG. 4 is an exemplary screenshot of caller request data that can be displayed on the workstation from FIG. 1.

FIG. 8 is an exemplary screenshot of caller request data for the advertiser from FIG. 7.

DETAILED DESCRIPTION

Figure 1:
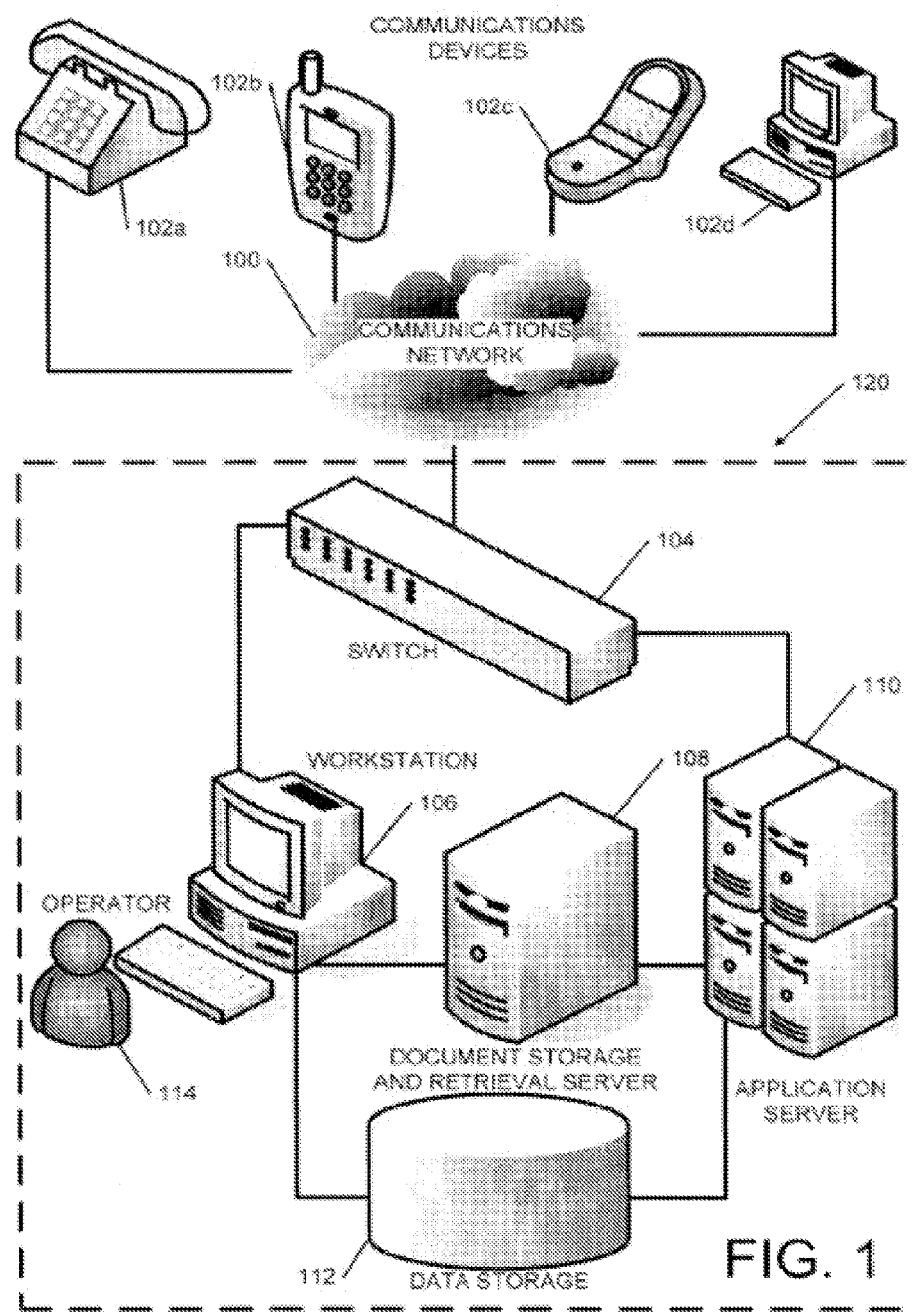
FIG. 1 is an exemplary network configuration for an advanced directory network.

FIG. 1 is an exemplary network configuration for an advanced directory network. As illustrated in this nonlimiting example, a caller using a communications device 102a, 102b, 102c, or 102d can initiate a call. More specifically, a caller can initiate a call to the advanced directory network 120 via a Public Switch Telephone Network (PSTN) telephone 102a, a mobile telephone 102b, a Voice over Internet Protocol (VoIP) telephone 102c, 102d (working either separately or together), or other communications device. Additionally, while the communications devices 102 are coupled to advanced directory network 120 via a communications network 100, the communications network 100 can include one or more communications networks operating in one or more communications protocols. More specifically, PSTN telephone 102a is configured to communicate via a PSTN. Mobile telephone 102b is configured to communicate via a cellular, Personal Communications Service (PCS), satellite, or other mobile communications network. VoIP telephones 102c, 102d are configured to communicate via the Internet or other data network. As one of ordinary skill in the art will understand, although communications devices 102 operating using different communications protocols, communications network 100 facilitates communications between communications devices 102 as well as with advanced directory network 120.

Included in the exemplary advanced directory network is a switch 104 that is configured to receive a call from one or more communications devices and route the call to a desired location. Additionally, switch 104 is configured to transfer a call from one network component to another, as well as to a business or individual associated with a desired listing. Coupled to the switch are a workstation 106, and an application server 110. The workstation 106 and the application server 100 are also coupled to a Document Storage and Retrieval (DSAR) server 108 and data storage 112.

One should note that although the components of advanced directory network 120 are illustrated as single components, this is a nonlimiting example. As one of ordinary skill in the art will understand one or more workstations, servers, switches, and/or data storage components may be implemented, depending on the particular configuration. Similarly, depending on the particular configuration, one or more of the components illustrated in FIG. 1 can be combined or removed to provide the desired functionality.

In one nonlimiting example, a caller places a call to the advanced directory network 120. Switch 104 holds the call and "bridges in" the desired network resources to the caller. A tenant determination can then be made by the application server 110 to determine whether advanced services are available to the caller. If advanced services are available, the application server 110 provides the caller with a desired menu. More specifically, when the call first arrives, there are many pieces of information that are used to determine the future actions of the call. Based on these incoming parameters, the call is assigned to a tenant. In at least one embodiment, this feature is reliant upon the underlying concept of a multi-tenant application architecture. A tenant, in this context, represents a group of calls that would get similar call flow treatment. As a nonlimiting example, a tenant could represent a telephone company customer, such as a specific wireless carrier. The application server 110 can support multiple tenant definitions, allowing for the customization of call flow options, branding prompts, etc. Also, statistics are kept and reported on a per-tenant basis.

At least one embodiment of the desired menu includes a Dual Tone Multi-Frequency (DTMF) based menu. Other embodiments include a voice recognition menu for determining caller responses. The caller can be prompted for language (e.g., English, Spanish, etc.), as well as information regarding the desired listing (or listings). In at least one exemplary embodiment, the caller is provided with a series of prompts for ascertaining the desired information. More specifically, as a nonlimiting example, the application server 110 provides the caller with a first prompt to determine the name of the desired listing, type of desired listing, etc. For example, if the caller indicates (through DTMF input, voice input, and/or other input) that the desired listing is a car dealer, the application server 110 can then prompt the caller to determine whether the desired listing sells cars or rents cars. If the caller indicates that that the desired listing sells cars, the caller is provided with a final prompt to determine the type of cars sold. Other embodiments can include an additional layer that can be configured to allow a user to search by "needs" and/or "attributes." If a caller "needs" to rent a Corvette, pay via an American Express® credit card and have, the car delivered, once the information is received, one or more names, addresses, telephone numbers that match (or at least partially match) this criteria can be returned to the caller. Additionally, in other embodiments, the caller may be provided with a "free flowing" user option, which can be configured to allow the user to provide the desired criteria without the advanced directory network prompting the user at each step.

Once the application server 110 receives information from the caller, the application server 110 sends a search query to data storage 112 for listings associated with the received information. If the received information narrows the search to a desirable number of listings, as determined by a system administrator, the listings can be sent to the caller. If, however, the search yields more than a desirable number of listings, the call is transferred to an operator 114 (or transferred back to the operator 114, as in at least one embodiment the call begins with the operator) at workstation 106. The operator then asks the caller supplemental questions to provide a desirable number of listings. Once the search is adequately narrowed by the operator, the workstation 106 sends the information to the DSAR server 108 (which can include a repository of Extensible Markup Language (XML) documents that contain more information related to the selected listings), which can issue a DSAR document that includes a DSAR key. The DSAR key is sent to the application server 110, and the operator requests that the switch 104 transfer the call back to the application server 110. The application server 110 then provides the caller with the selected listing(s). The application server can be configured to use the DSAR key much like a card catalog is used in a library. When a caller chooses a listing they want from among the options presented via back-end audio, the DSAR key is sent to the application server requesting that all information related to the chosen listing be sent to back-end audio to fulfill the request.

As another nonlimiting example, the application server 110 provides the caller with a single open-ended prompt for receiving the desired information. More specifically, the application server 110 provides the user with a prompt requesting attributes of the desired listing. Upon receiving a response from the caller, the application server 110 can request a search of data in data storage 112, as described above. For example, if the caller desires information related to a car dealer, as discussed above, the caller can respond to the prompt by saying (typing or otherwise inputting) "Toyota® dealer, new car, close to home." The application server 110 can then determine whether this is enough information to retrieve a desired number of listings. If so, the application server can provide the data as discussed above. If this is not enough information, the call can be transferred to an operator who can ask additional questions to more specifically determine the desired listings.

Still other embodiments solicit information from the caller solely for the purposes of the operator 114 performing a search for the desired listing(s). More specifically, in this nonlimiting example, the application server 110 provides one or more prompts to the caller. Upon receiving a response from the caller, the application server 110 communicates the received data to the workstation 106. With the received data, the operator 114 can search data storage 112 for the desired listing(s). As discussed above, a key to the results are sent to the application server 110, which accesses DSAR server 108 to obtain more information related to the selected listings. The application server 110 then provides the caller with the selected listings.

Figure 2:
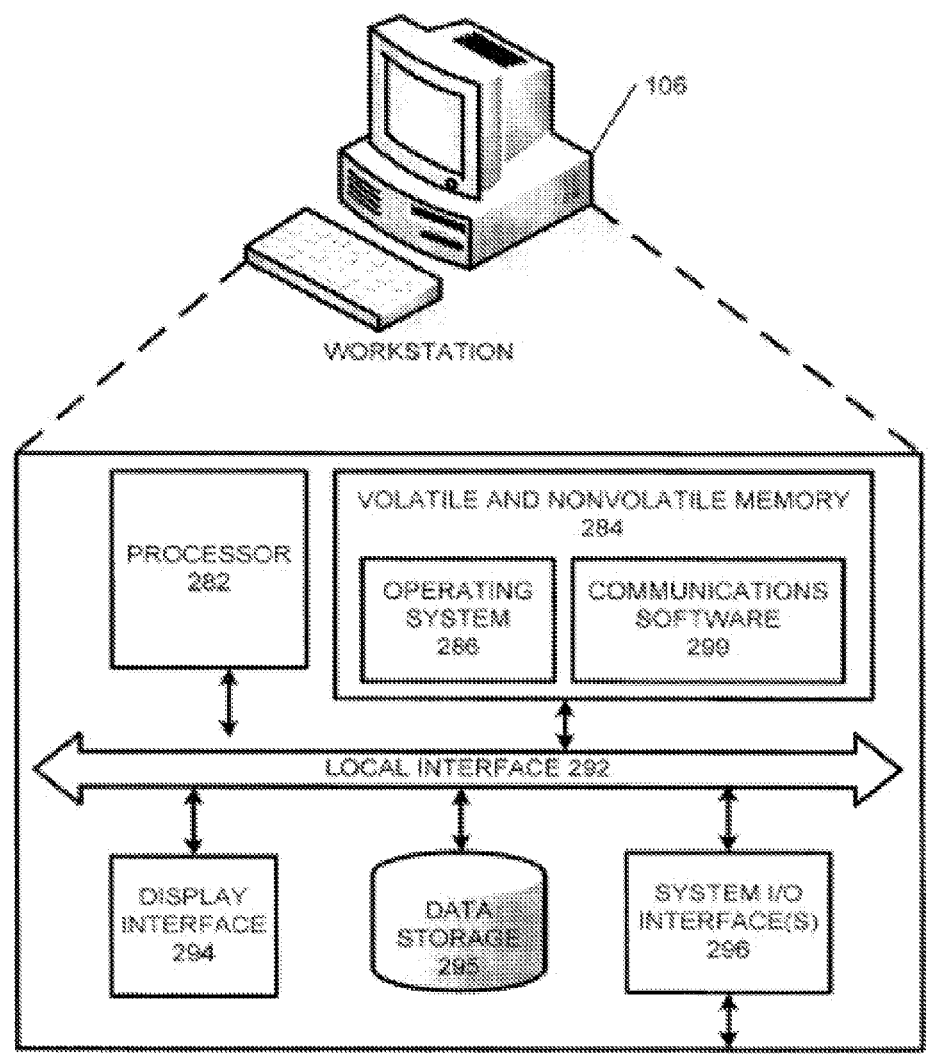
FIG. 2 is a functional diagram illustrating an exemplary embodiment of a workstation that may be configured to communicate via a communications network such as the advanced directory network from FIG. 1.

FIG. 2 is a functional diagram illustrating an exemplary embodiment of a workstation that may be configured to communicate via a communications network such as the advanced directory network from FIG. 1. Although a wireline client device is illustrated, this discussion can be applied to any device. Generally, in terms of hardware architecture, as shown in FIG. 2, the workstation 106 includes a processor 282, volatile and nonvolatile memory 284, a display interface 294, data storage 295, and one or more input and/or output (I/O) device interface(s) 296 that are communicatively coupled via a local interface 292. The local interface 292 can include, for example but not limited to, one or more buses or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a hardware device for executing software, particularly software stored in volatile and nonvolatile memory 284.

The processor 282 can be any custom made or commercially available processor, a central processing unit (CPU), an auxiliary processor among several processors associated with the workstation 106, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 284 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 284 may incorporate electronic, magnetic, optical, and/or other types of storage media. Note that the volatile and nonvolatile memory 284 can have a distributed architecture, where various components are situated remote from one another, but can be accessed by the processor 282. Additionally volatile and nonvolatile memory 284 can also include an operating system 286, as well as communications logic 299 (or software). Embodiments of communications logic 299 include logic for communicating with various components within the advanced directory network, as well as other components. Embodiments of communications logic 299 are also configured to facilitate communication with a caller and facilitate searching for a desired listing.

The software in volatile and nonvolatile memory 284 may include one or more separate programs, each of which includes an ordered listing of executable instructions for implementing logical functions. In the example of FIG. 2, the software in the volatile and nonvolatile memory 284 may include communications software 299, as well as operating system 286. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 286 can be configured to control the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 284, so as to operate properly in connection with the Operating System 286.

The Input/Output devices that may be coupled to system I/O Interface(s) 296 may include input devices, for example but not limited to, a keyboard, mouse, scanner, microphone, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the workstation 106 is a personal computer, workstation, or the like, the software in the volatile and nonvolatile memory 284 may further include a basic input output system (BIOS) (omitted for simplicity). The BIOS is a set of software routines that initialize and test hardware at startup, start the Operating System, and support the transfer of data among the hardware devices. The BIOS is stored in ROM so that the BIOS can be executed when the workstation 106 is activated.

When the workstation 106 is in operation, the processor 282 is configured to execute software stored within the volatile and nonvolatile memory 284, to communicate data to and from the volatile and nonvolatile memory 284, and to generally control operations of the workstation 106 pursuant to the software. Software in memory, in whole or in part, are read by the processor 282, perhaps buffered within the processor 282, and then executed.

Additionally, as stated above, while reference in FIG. 2 is made to a workstation, similar architecture can apply to one or more of the components in the advanced directory network. More specifically, depending on the particular configuration, switch 104, DSAR server 108, application server 110, data storage 112, as well as communications devices 102 can include similar architecture as described with reference to FIG. 2. Further due to the differing functionality for these devices, a variance in the hardware and/or software components can be expected.

FIG. 3 is an exemplary screenshot of caller data that can be displayed on the workstation from FIG. 1. As illustrated in this nonlimiting example, caller information window 370 includes the name of the current caller, address of the caller, phone number of the caller, current request, previous requests, and selections.

In other embodiments, more or less data can be provided, such as email address, instant messaging address, alternate communications addresses, etc.

Upon calling the advanced directory network, the caller can provide information related to his or her identity. This information can be provided via callerid or similar identification techniques, however this is not a requirement. Other embodiments provide that the user can enter a USERID and password or perform one or more biometric authentication techniques (or any permutation of the above mentioned). Regardless of the authentication process, once the advanced directory network ascertains the identity of the caller, other identifying and historical data can be retrieved.

As shown in FIG. 3, the caller is John Doe, who lives at 123 Fake Street in Atlanta. John's phone number is also provided, as well as the current request. While in some embodiments the current request data is provided from the caller to the operator 114 for conducting the search, other embodiments provide that this data is sent to the application server 110 for conducting the search. In these embodiments, depending on the search results, the desired listings are sent to the caller or the call is transferred to the operator to further narrow the search.

Additionally, data related to previous requests is also provided in the caller information window 370 of FIG. 3. This data is retrieved from data storage 112 (or other data storage) and helps determine preferences of the caller. Similarly, caller information window 370 includes selections previously made by the caller. More specifically, data related to the selected listings are documented to more accurately determine future desires of the caller. As illustrated in FIG. 3, John Doe previously selected the listings that were closest to his house. With this information the operator 114 can assume that location of various listings is a top priority to this caller.

FIG. 4 is an exemplary screenshot of caller request data that can be displayed on the workstation from FIG. 1. As illustrated in this nonlimiting example, caller request window 470 can include a plurality of options to determine a desired listing. More specifically, the caller's name can be entered, as well as the current request. In the nonlimiting example of FIG. 4, the caller is John Doe, and the request category is a gym. As discussed above, by entering the caller's name, determinations can be made to provide more accurate results based on previous selections.

Additionally, depending on the data entered in the request prompt, the workstation 106 can alter the sub-category options listed below. More specifically, in caller request window 470, "Gym" is entered in the request prompt. As a result, the sub-categories "location," "equipment," "amenities," "classes," "personal trainers," and "hours" are also provided as options for narrowing the search. In this nonlimiting example, the caller desires a gym that is close to home with free weights, a swimming pool, and a basketball court. If however, the user is looking for e.g., a car dealer, other, possibly different sub-category options can be provided that relate to that category of listing. One should note that, depending on the particular embodiment, any criteria may be used for a category and/or sub-category, as is disclosed in the Greater Atlanta BellSouth® Real Yellow Pages®, corrected through Aug. 15, 2005, volumes A-L, and M-Z reference number 13190, which is hereby incorporated by reference in its entirety.

Figure 5:
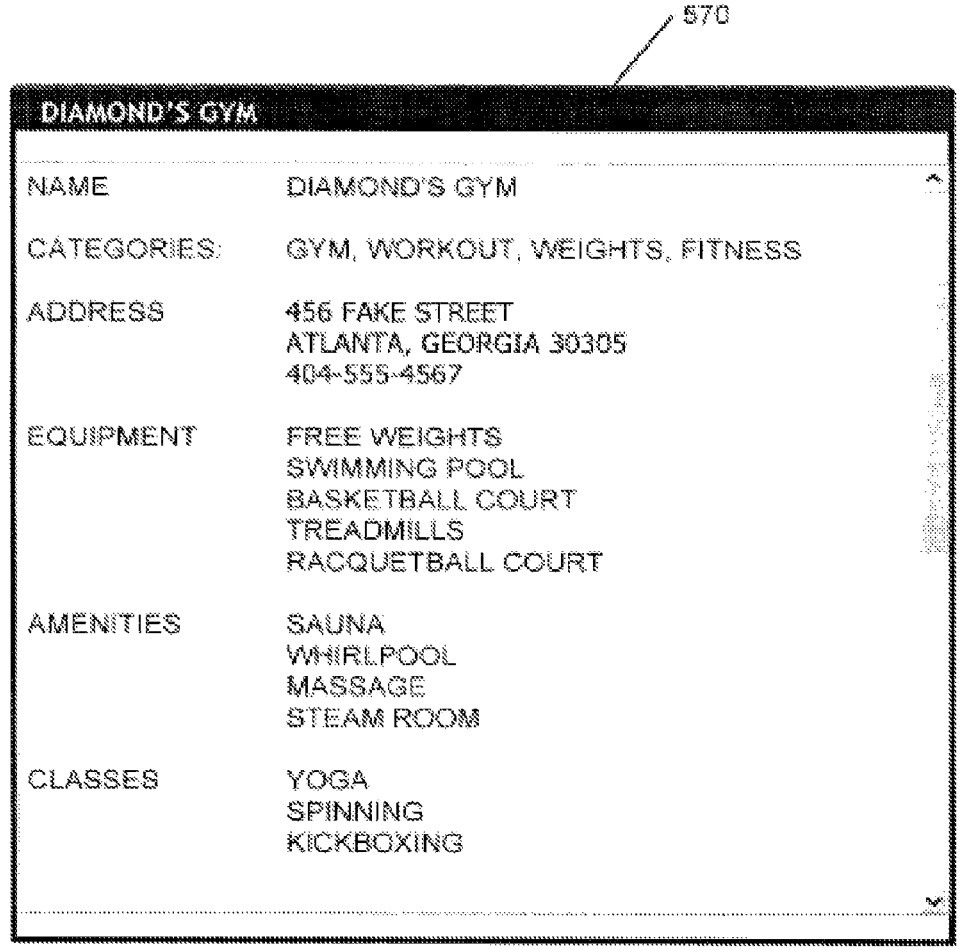
FIG. 5 is an exemplary screenshot of advertiser data that can be stored in the data storage from FIG. 1.

FIG. 5 is an exemplary screenshot of advertiser data that can be stored in the data storage from FIG. 1. The advertiser window 570 can include data related to a listing for the advertiser Diamond's Gym. The advertiser can include any of a plurality categories for searching the listing, as well as providing data for the sub-categories in the listing. More specifically, As illustrated in the nonlimiting example of advertiser window 570, Diamond's Gym is associated with the gym category, the workout category, the weights category and the fitness category. Similarly, under the equipment, amenities, and classes sub-categories, Diamond's Gym lists various data. Additionally, Diamond's Gym lists an address and telephone number.

One should note that, depending on the particular configuration, either the advertiser or the advanced directory network 120 can determine the categories and sub-categories associated with the advertiser's listing. As a nonlimiting example, the advanced directory network 120 can create a plurality of categories for advertisers to subscribe. The advanced directory network 120 can then charge an advertiser for each category of business under which the advertiser wishes to be listed. Similar charges can apply to the sub-categories associated with that listing.

Figure 6:
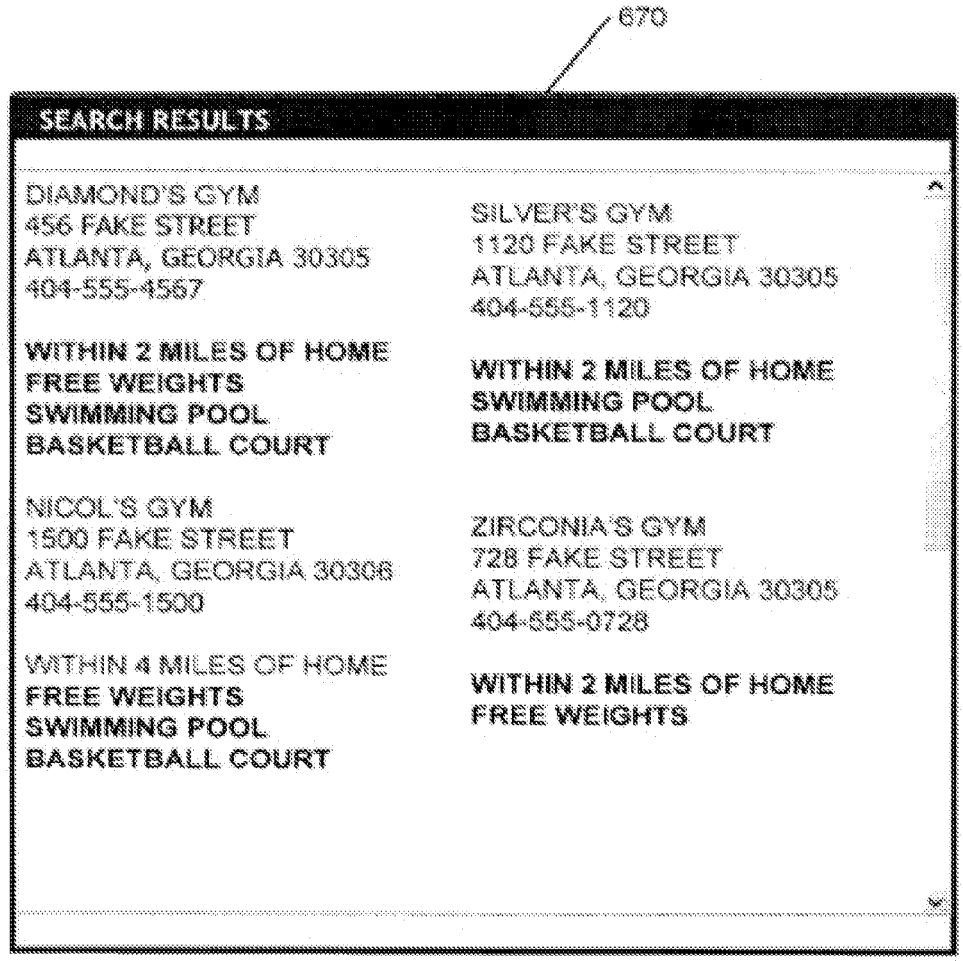
FIG. 6 is an exemplary screenshot of a plurality of search results that can be displayed on the workstation from FIG. 1.

FIG. 6 is an exemplary screenshot of a plurality of search results that can be displayed on the workstation from FIG. 1. As illustrated in the nonlimiting example of FIG. 6, by conducting the search from FIG. 4, the search results window 670 can display a plurality of listings that fit the search criteria. More specifically, Diamond's Gym is displayed along with the sub-category attributes that Diamond's Gym shares with the conducted search. Additionally, Nicol's Gym, Silver's Gym, and Zirconia's Gym are also displayed with the sub-category attributes that these listings share with the current search.

In at least one exemplary embodiment, the search results window 670 is displayed on workstation 106 for operator 114. With the data from search results window 670 available to the operator 114, the operator 114 can select a desirable number of listings to provide the caller. If it is determined that the search revealed a desirable number of results, operator input may be bypassed, and the results may be simply provided to the caller.

Figure 7:
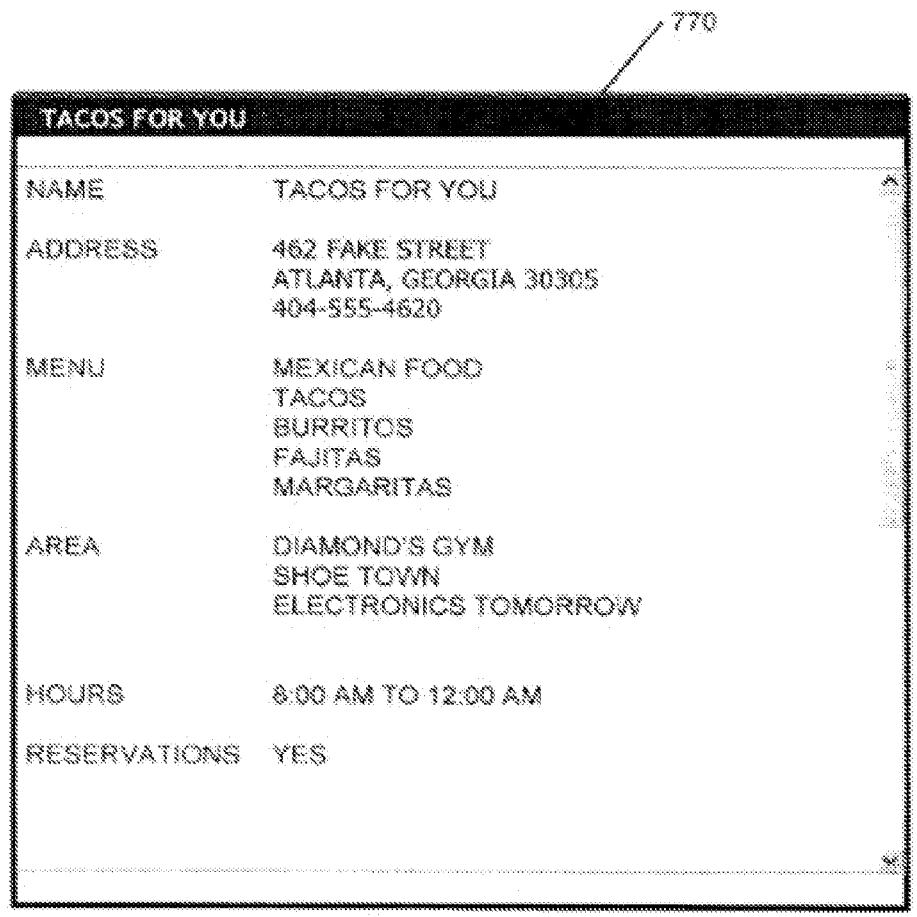
FIG. 7 is an exemplary screenshot of advertiser data that can be displayed, illustrating different types of data from the display from FIG. 5.

FIG. 7 is an exemplary screenshot of advertiser data that can be displayed, illustrating different types of data from the display from FIG. 5. Similar to the nonlimiting example of FIG. 5, advertiser window 770 includes the name and address of the advertiser (Tacos For You). However, because Tacos for You is a restaurant, this listing includes different sub-categories than are associated with the Gym listing discussed above. More specifically, the nonlimiting example of FIG. 7 includes sub-categories related to the restaurant's menu, as well as other merchants that are in the area with this advertiser, hours of operation, and whether this advertiser takes reservations. Other embodiments include more or less data depending on the configuration.

FIG. 8 is an exemplary screenshot of caller request data for the advertiser from FIG. 7. Similar to the caller request window 470, the caller request window 870 includes the name of the caller as well as the request category, and sub-category attributes related to that request. In the nonlimiting example of FIG. 8, the caller has requested a Mexican restaurant close to Diamond's Gym.

Figure 9A:
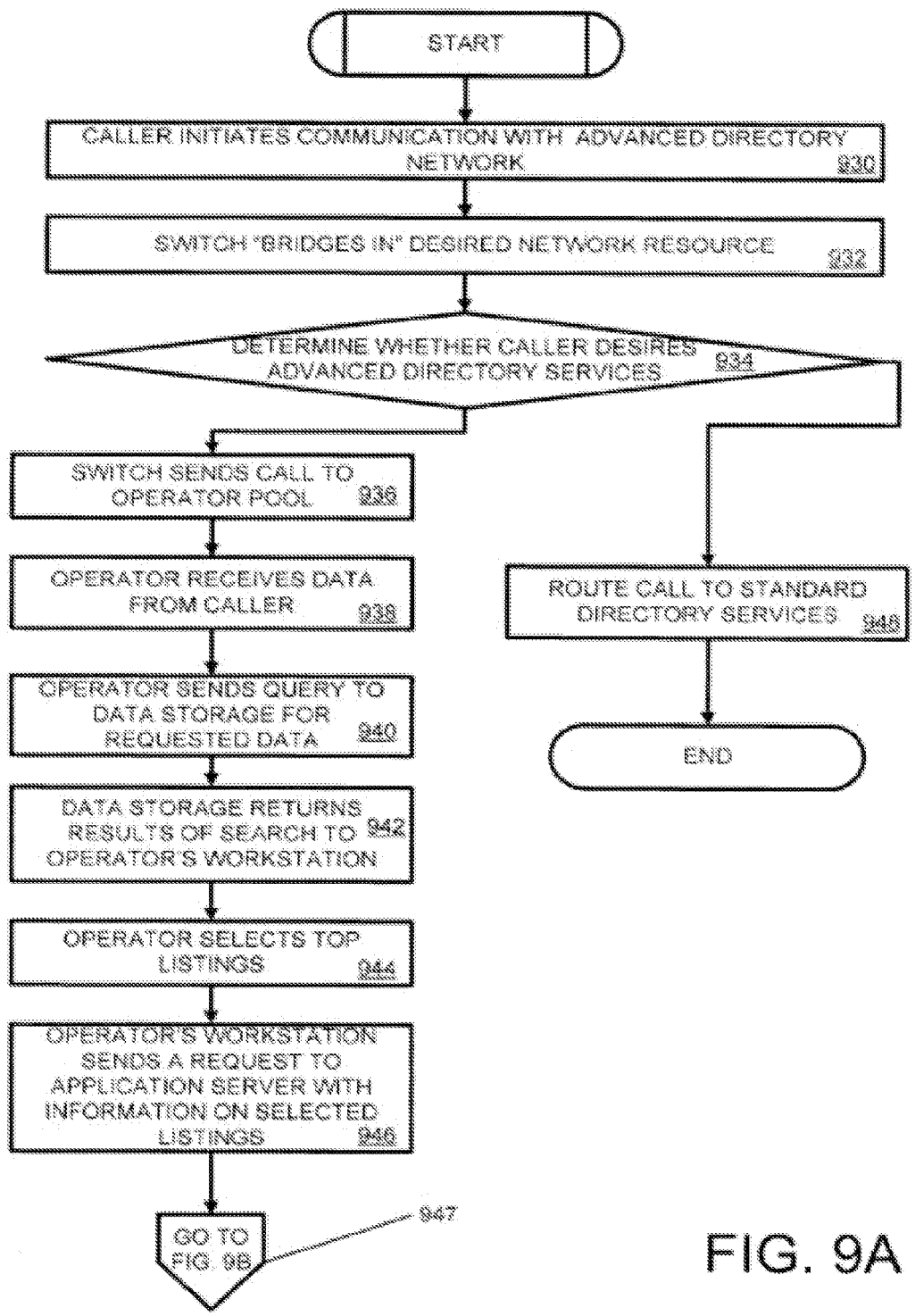
FIG. 9A is a flowchart illustrating exemplary steps that can be taken in providing advanced directory services, as in the advanced directory network from FIG. 1.

FIG. 9A is a flowchart illustrating exemplary steps that can be taken in providing advanced directory services, as in the advanced directory network from FIG. 1. The first step in this nonlimiting example it that the caller initiates a communication with advanced directory network 120 (block 930). The caller can initiate this communication in any of a plurality of ways including, but not limited to dialing "41 1," entering a URL associated with the advanced directory network, dialing a 10-digit number, dialing a "1800" number, dialing an access code, etc. Once the caller is connected with the advanced directory network 120, a switch 104 "bridges in" the desired network resources (block 932). The automated application server 1 10 can determine whether the caller desires (or is configured to receive) advanced directory services (block 934). If the caller does not desire advanced directory services, the call is routed to facilitate standard directory services (block 948). If, however, the caller desires advanced directory services, the switch 104 sends the call to an operator pool (block 936). In receiving the transferred call, an operator in the operator pool receives data from the caller (block 938). As discussed above, some embodiments include ascertaining data from the caller via one or more menu prompts, while other embodiments include ascertaining this information via the operator asking the caller a series of questions (some embodiments employ both techniques). Regardless, upon receiving the desired information, the operator sends a query to data storage 112 for the requested data (block 940). More specifically, upon receiving data related to the desired listing, the operator can perform a search for the desired listing.

Data storage 112 then returns results of the search to the operator's workstation 106 (block 942). Upon reviewing the received results, the operator selects the most desirable results (block 944) and the operator's workstation 106 releases the results to a back-end audio system. The workstation then sends a request to the application server 110 with data related to the selected listings to deliver to the back-end audio system, retrieved listing information and present the results to the caller (block 946). The flowchart then proceeds to jump block 947.

Additionally, the advanced directory network can be configured to provide, to the caller, listing information (e.g., name, address, telephone number, etc.) associated with the results. Additionally, the advanced directory network can be configured to return to the operator the top results. The operator can confirm that the results are consistent with the caller's request and then release the results to the back-end audio system. Other data can also be relayed to the caller including, but not limited to driving directions, "find nearest" information, photographs of the business, etc.

Figure 9B:
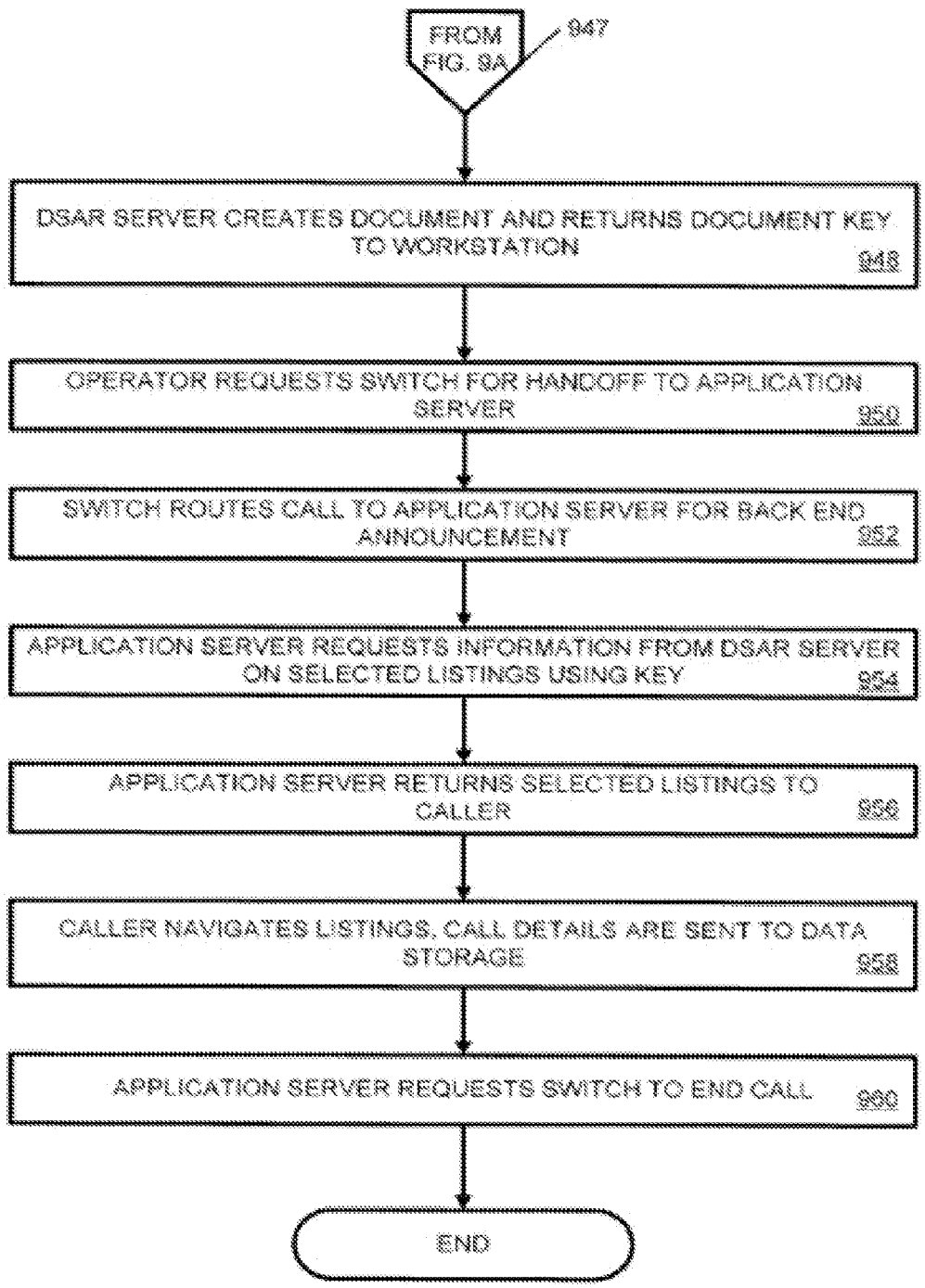
FIG. 9B is a continuation of the exemplary flowchart from FIG. 9A.

FIG. 9B is a continuation of the exemplary flowchart from FIG. 9A. From jump block 947, the flowchart proceeds and the DSAR server 108 creates a document and returns a document key to the operator's workstation 106 (block 948). The operator then requests the switch 104 for handoff of the call to the application server 110 (block 950). The switch 104 routes the call to the application server 110 for a back end announcement (block 952). The application server 110 then requests information from the DSAR server 108 on the selected choices using the received DSAR key (block 954). Once the application server 110 receives the requested data, the application server 110 sends the selected listings to the caller (block 956). The caller can then navigate the listings, and call details may be sent to data storage 112 (block 958). The application server 110 then requests the switch 104 to end the call (block 960).

One should not that although FIGS. 9A and 9B illustrate an embodiment where the call is sent to an operator pool (block 936), this is a nonlimiting example. More specifically, in at least one embodiment, the application server can be configured to provide advanced directory services by querying data storage 112 without involving an operator. If a problem arises (such as not being able to locate a desirable number of listings, caller confusion, etc.), the call can then be routed to an operator.

Figure 10:
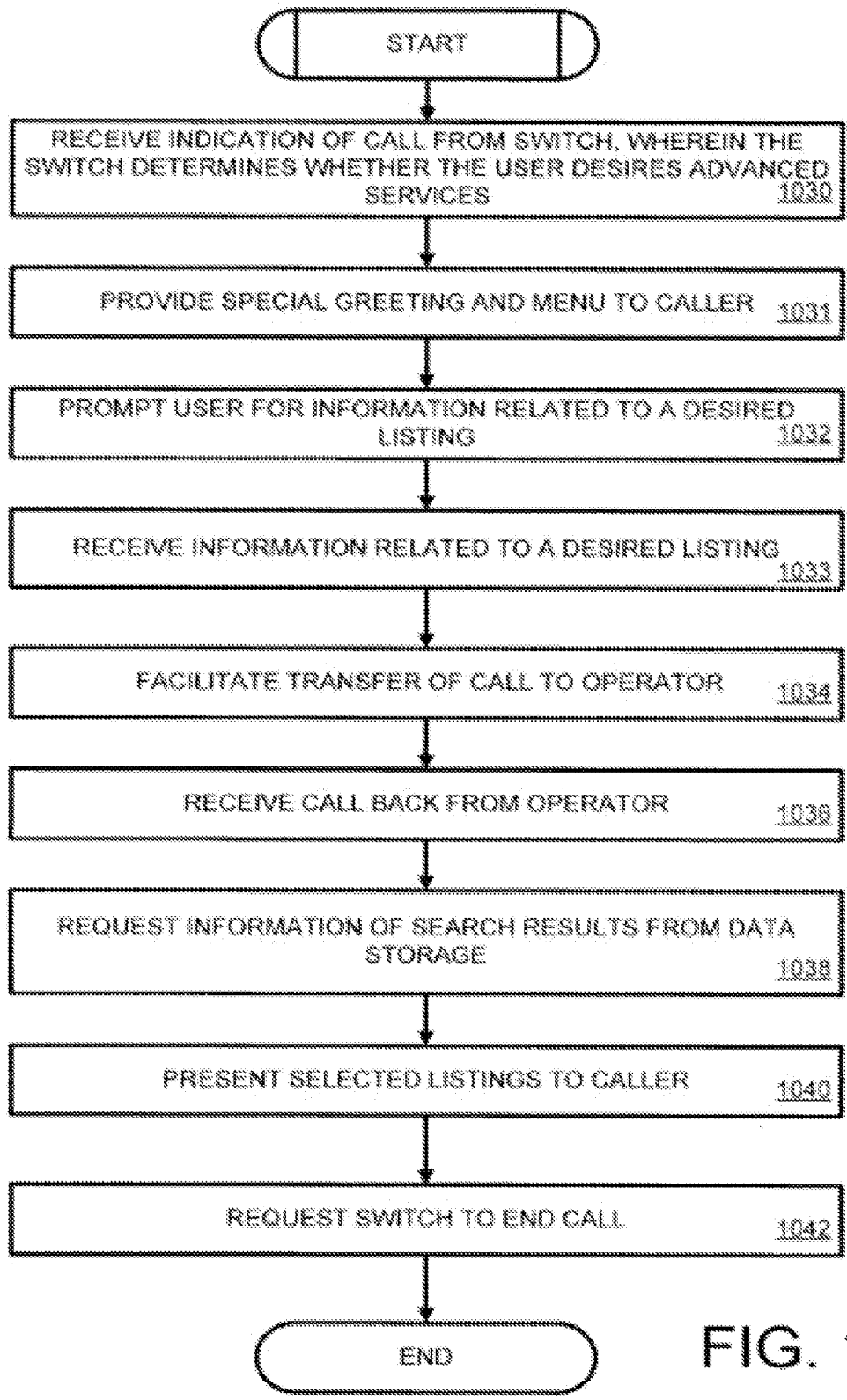
FIG. 10 is a flowchart illustrating exemplary steps that can be taken in the application server from FIG. 1.

FIG. 10 is a flowchart illustrating exemplary steps that can be taken in the application server from FIG. 1. The first step in the nonlimiting example of FIG. 10 is for the application server 110 to receive indication of a call from the switch 104 (block 1030). Once it is determined that the caller is interested in (and able to receive) advanced directory services, the application server 110 provides a special greeting and menu to the caller (block 1031). While in some embodiments the special greeting includes an advertisement, this is not a requirement. Other embodiments can simply inform the user of the services offered and/or directions for use. After presenting the menu to the caller, the application server 110 prompts the user for information related to a desired listing and upon receiving a response from the user (block 1032) and can receive a response from the user (block 1033). The application server can then facilitate transfer of the call to the operator (block 1034). This can include sending a transfer request to the switch 104, however this is not a requirement. Once the operator has completed the desired operations (which, in some embodiments, includes the operator performing a search for desired listings), the application server 110 will receive the call back from the operator (block 1036). The application server 110 then requests information related to the search results from data storage 112 (block 1038) and presents the selected listings to the caller (block 1040). When the caller has completed the call (via hanging up, requesting connection with one or more of the listings, or both), the application server 110 requests the switch to terminate the call (block 1042).

As discussed above, while FIG. 10 refers to transferring the call to an operator, this is a nonlimiting example. In at least one embodiment, the application server can be configured to provide advanced directory services without the operator. Similarly, other embodiments can be configured to involve an operator upon a user request.

Figure 11:
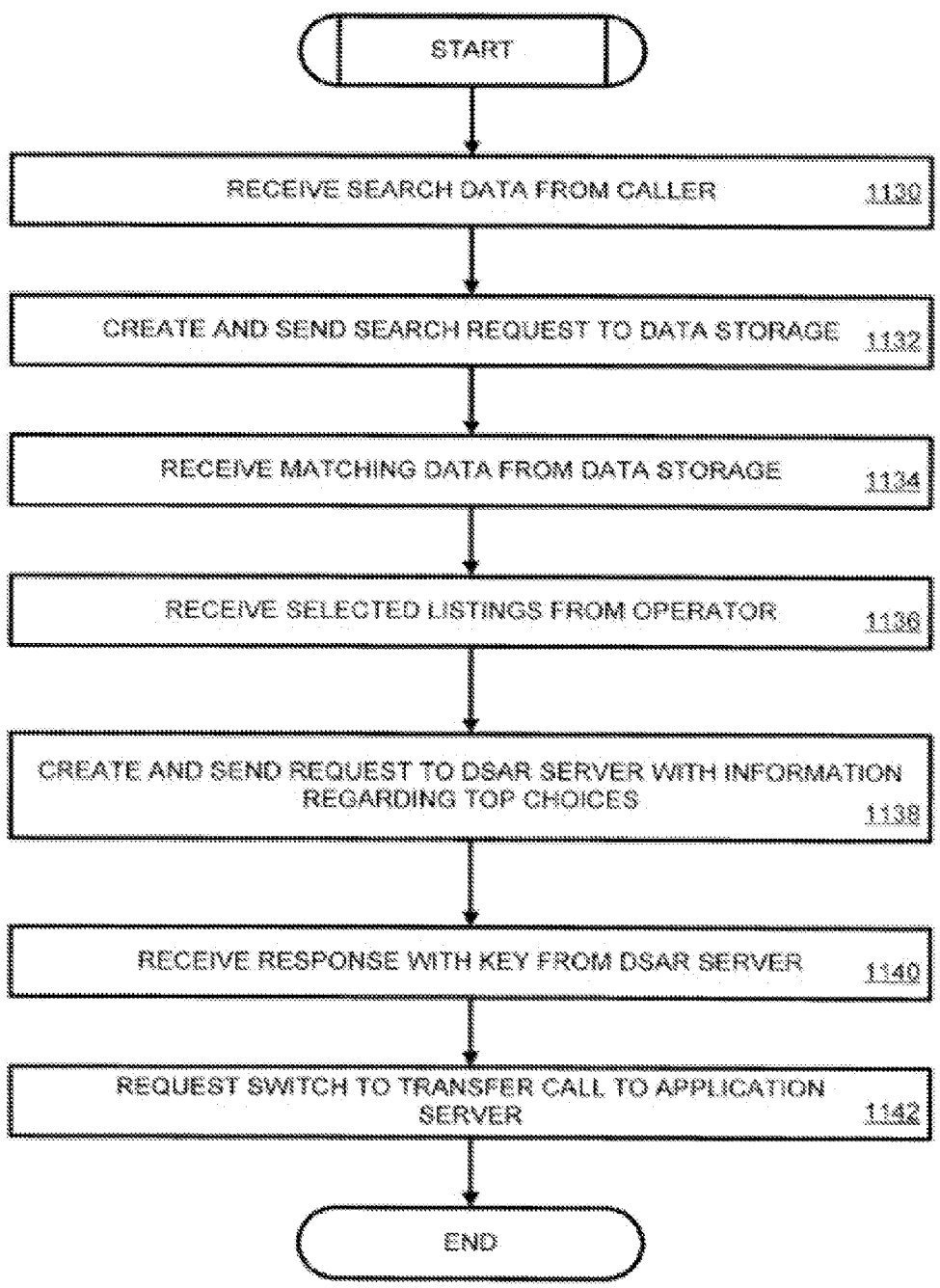
FIG. 11 is a flowchart illustrating exemplary steps that can be taken in the workstation from FIG. 1.

FIG. 11 is a flowchart illustrating exemplary steps that can be taken in the workstation from FIG. 1. The first step in the nonlimiting example of FIG. 10 is for the workstation 106 to receive search data from a caller (block 1130). As discussed above, the search data can be requested via one or more prompts to the caller, and depending on the particular configuration, the caller's responses can include voice data, textual data, pictorial data, audio data, or video data (or any permutation). Additionally, depending on the particular configuration, additional data can be ascertained via a conversation between the caller and the operator. This data can also be input to the workstation 106.

Once data is received from the caller, the workstation 106 creates and sends a search request to data storage 112 (block 1132). The request includes at least a portion of the data ascertained from the caller, which is compared to data stored at data storage 112 to find possible listings with similar criteria as that indicated by the caller. Once the search is complete, the workstation 106 receives matching data from data storage (block 1134). The matching data includes one or more listings that include at least one category or sub-category attribute that is similar to the data received from the caller. The workstation 106 can then display this matching data to the operator.

Next, the workstation 106 receives the selected listings from the operator (block 1136). Upon viewing the matching data, the operator can narrow the listings down to a desirable number of listings to provide to the caller. The operator can then determine the selected listings on the workstation 106 and the workstation 106 can create and send a request to the DSAR server 108 with information regarding the selected listings (block 1138). The workstation 106 then receives a response from the DSAR server 108 with a key to the selected listings (block 1140). The operator (via the workstation) requests a handoff to the back-end via the switch, and includes a context block with the DSAR server document key. The workstation 106 then requests the switch 104 to transfer the call to the application server (block 1142).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:
1. A method comprising:
receiving, by a switch, a call from a mobile communications device of a caller for a desired listing, wherein:
    the desired listing is a business listing; and
    the switch is configured to:
        receive calls from at least one communications device;
        route any of the calls to a desired location;
        transfer any of the calls to and from a network device; and
        transfer any of the calls to a business associated with any desired listing;
placing, by the switch, the call on hold;
bridging, by the switch, the call to an application server;
providing, by the application server, via the switch, a prompt to the mobile communications device to determine the desired listing;
receiving, by the application server, from the mobile communications device via the switch, an indication of the desired listing;
providing, by the application server, a query to a data storage for at least one listing associated with the desired listing;
responsive to the query, receiving, by the application server from the data storage, found listings, wherein at least a portion of the found listings is determined by an advertiser;
providing the found listings to a workstation, wherein the workstation, the data storage, and the application server are distributed and disparate;
transferring the call, via the switch, to the workstation;
when a number of the found listings is greater than a desirable number of listings, in order to reduce the number of the found listings to the desirable number of listings, providing, from the workstation, via the switch to the mobile communications device, a request for supplemental information regarding the desired listing;
receiving, by the workstation, from the mobile communications device via the switch, a response to the request for the supplemental information;
determining, by the workstation, based on the response to the request for the supplemental information, a second listing;
providing, by the workstation to a document storage and retrieval (DSAR) server, the second listing;
receiving, from the DSAR server, a DSAR key that is associated with the desired listing and is based on the second listing;
providing, by the workstation to the application server, the DSAR key;
providing a request from the workstation to the switch to transfer the call to the application server;
transferring, by the switch, the call from the workstation to the application server in response to the request from the workstation to the switch;
providing, by the application server to the DSAR server, the DSAR key and a request for selected listings based on the DSAR key; and
providing, to the caller by the application server, via the switch:
    an indication of the selected listings;
    a photograph of at least one business entity associated with the selected listings;

driving directions to the at least one business entity associated with the selected listings; and information pertaining to finding any other nearest business entity associated with the selected listings.

2. The method of claim 1, wherein the desired listing comprises at least one communications address.

3. The method of claim 1, further comprising facilitating display of the found listings at the workstation.

4. The method of claim 1, further comprising receiving, at the workstation, operator input indicating a selection of the desired listing.

5. The method of claim 1, wherein the found listings comprise data related to a type of business.

6. A tangible computer readable storage medium that is not a transmission medium or a propagating medium, the tangible computer readable storage medium having stored thereon executable instructions that when executed cause a processor to perform operations comprising:

receiving, by a switch, a call from a mobile communications device of a caller for a desired listing, wherein:
the desired listing is a business listing; and
the switch is configured to:
receive calls from at least one communications device;
route any of the calls to a desired location;
transfer any of the calls to and from a network device; and
transfer any of the calls to a business associated with any desired listing;
placing, by the switch, the call on hold;
bridging, by the switch, the call to an application server;
providing, by the application server, via the switch, a prompt to the mobile communications device to determine the desired listing;
receiving, by the application server, from the mobile communications device via the switch, an indication of the desired listing;
providing, by the application server, a query to a data storage for at least one listing associated with the desired listing;
responsive to the query, receiving, by the application server from the data storage, found listings, wherein at least a portion of the found listings is determined by an advertiser;
providing the found listings to a workstation, wherein the workstation, the data storage, and the application server are distributed and disparate;
transferring the call, via the switch, to the workstation;
when a number of the found listings is greater than a desirable number of listings, in order to reduce the number of the found listings to the desirable number of listings, providing, from the workstation, via the switch to the mobile communications device, a request for supplemental information regarding the desired listing;
receiving, by the workstation, from the mobile communications device via the switch, a response to the request for the supplemental information;
determining, by the workstation, based on the response to the request for the supplemental information, a second listing;
providing, by the workstation to a document storage and retrieval (DSAR) server, the second listing;
receiving, from the DSAR server, a DSAR key that is associated with the desired listing and is based on the second listing;
providing, by the workstation to the application server, the DSAR key;
providing a request from the workstation to the switch to transfer the call to the application server;
transferring, by the switch, the call from the workstation to the application server in response to the request from the workstation to the switch;
providing, by the application server to the DSAR server, the DSAR key and a request for selected listings based on the DSAR key; and
providing, to the caller by the application server, via the switch;
an indication of the selected listings;
a photograph of at least one business entity associated with the selected listings;
driving directions to the at least one business entity associated with the selected listings; and
information pertaining to finding any other nearest business entity associated with the selected listings.

7. The computer readable storage medium of claim 6, wherein the desired listing comprises at least one communications address.

8. The computer readable storage medium of claim 7, the operations further comprising facilitating display of the desired listing.

9. The computer readable storage medium of claim 6, the operations further comprising receiving operator input indicating a selection of the desired listing.

10. The computer readable storage medium of claim 6, wherein the found listings comprise data related to a type of business.

11. A system comprising:
a switch, an application server, a workstation, a data storage, and a document storage and retrieval (DSAR) server, that are configured to perform operations comprising:
receiving, by a switch, a call from a mobile communications device of a caller for a desired listing, wherein:
the desired listing is a business listing; and
the switch is configured to:
receive calls from at least one communications device;
route any of the calls to a desired location;
transfer any of the calls to and from a network device; and
transfer any of the calls to a business associated with any desired listing;
placing, by the switch, the call on hold;
bridging, by the switch, the call to the application server;
providing, by the application server, via the switch, a prompt to the mobile communications device to determine the desired listing;
receiving, by the application server, from the mobile communications device via the switch, an indication of the desired listing;
providing, by the application server, a query to the data storage for at least one listing associated with the desired listing;
responsive to the query, receiving, by the application server from the data storage, found listings, wherein at least a portion of the found listings is determined by an advertiser;
providing the found listings to the workstation, wherein the workstation, the data storage, and the application server are distributed and disparate;
transferring the call, via the switch, to the workstation;
when a number of the found listings is greater than a desirable number of listings, in order to reduce the number of the found listings to the desirable number listings, providing, from the workstation, via the switch to the mobile communications device, a request for supplemental information regarding the desired listing;

receiving, by the workstation, from the mobile communications device via the switch, a response to the request for the supplemental information;

determining, by the workstation, based on the response to the request for the supplemental information, a second listing;

providing, by the workstation to the document storage a data store and retrieval (DSAR) server, the second listing;

receiving, from the DSAR server, a DSAR key that is associated with the desired listing and is based on the second listing;

providing, by the workstation to the application server, the DSAR key;

providing a request from the workstation to the switch to transfer the call to the application server;

transferring, by the switch, the call from the workstation to the application server in response to the request from the workstation to the switch;

providing, by the application server to the DSAR server, the DSAR key and a request for selected listings based on the DSAR key; and providing, to the caller by the application server, via the switch:
- an indication of the selected listings;
- a photograph of at least one business entity associated with the selected listings;
- driving directions to the at least one business entity associated with the selected listings; and
- information pertaining to finding any other nearest business entity associated with the selected listings.

12. The system of claim 11, the operations further comprising sending a search request for the desired listing.

13. The system of claim 11, the operations further comprising transferring the caller to an operator for determining the desired listing.

14. The system of claim 11, the operations further comprising determining whether the caller desires advanced directory services.

* * * * *

UNITED STATES PATENT AND TRADEMARK OFFICE
CERTIFICATE OF CORRECTION

PATENT NO.         : 8,335,777 B2
APPLICATION NO.    : 11/470125
DATED              : December 18, 2012
INVENTOR(S)        : Alvin Charles Miles and John Jeffrey Decker It is certified that error appears in the above-identified patent and that said Letters Patent is hereby corrected as shown below:

In the Claims:

Column 15,
Claim 11, lines 12-13, after "to the document storage" delete "a data store".

Signed and Sealed this
Twenty-eighth Day of May, 2013

Teresa Stanek Rea
*Acting Director of the United States Patent and Trademark Office*